Sept. 23, 1969 SHIN-CHI OHASHI ET AL 3,469,173

SPIKE NOISE ELIMINATION CIRCUIT FOR A D.C.-A.C. CONVERTER

Filed Dec. 2, 1966 2 Sheets-Sheet 1

United States Patent Office 3,469,173

Patented Sept. 23, 1969

3,469,173

SPIKE NOISE ELIMINATION CIRCUIT FOR A D.C.-A.C. CONVERTER

Shin-ichi Ohashi, Kodaira-shi, and Toshijiro Takagi, Tokyo-to, Japan, assignors to Hitachi, Ltd., Tokyo-to, Japan

Filed Dec. 2, 1966, Ser. No. 598,817
Claims priority, application Japan, Dec. 6, 1965, 40/74,624; July 20, 1966, 41/47,032
Int. Cl. H02m *7/46*
U.S. Cl. 321—44 17 Claims

ABSTRACT OF THE DISCLOSURE

A spike noise elimination circuit for a D.C.-A.C. converter utilizing a semi-conductor chopper followed by an A.C. amplifier and two spike-removing switches connected in the output of the amplifier whereby a first series circuit consisting of a capacitor and the first switch is connected across the output of the amplifier while a second series circuit consisting of a second capacitor and the other switch is connected across the first switch, and the two switches are so controlled during alternate periods of the converted A.C. signal that spikes present in the output of the amplifier are eliminated during the alternate conductive periods of the respective switches.

Background of the invention

The present invention relates to a spike noise elimination circuit for a D.C.-A.C. converter utilizing a chopper, and more particularly to a spike noise elimination circuit for the type of converter utilizing a semi-conductor chopper.

In ordinary, prior art D.C.-A.C. converters, a D.C. or a very low frequency input signal is intermittently chopped and is converted into a signal of rectangular wave-form, for example, by a semi-conductor chopper. The chopped input signal is then amplified by an A.C. amplifier, and is further rectified synchronously with the chopping operation of the chopper. However, due to the fact that the chopper does not produce ideal switching operations, a pulse-like noise voltage, a so-called "spike" is superposed on the output wave-form of the prior art converters. Various disadvantages ensue from such spike voltages in the output wave form of the converted A.C. signal, such as saturation of the following A.C. amplifier, production of off-set voltages or drift caused by variation of the amount of the "spike" due to the variation of the ambient temperature.

A D.C.-A.C. converter is already known in the prior art which is provided, after the amplifier stage, with a spike-removing switch operated synchronously with the chopper so as not to produce any A.C. output when the spike is generated. However, in this prior art converter, owing to the fact that the actual wave-form of the spike is attenuated almost exponentially, it is desirous that the operating period of the spike-removing switch is as long as possible for the purpose of removing the spike voltages. On the other hand, if this period is too long, the required A.C. output signal also is nullified during that period, whence a limit exists for lengthening this period so that the spike-removing effect of this prior art device is insufficient.

Summary of the invention

Accordingly, the primary object of the present invention is to provide a novel and improved spike noise elimination circuit for a D.C.-A.C. converter which is capable of completely removing the aforementioned exponentially varying damping spike voltages.

To accomplish this object, a circuit according to the present invention comprises first and second switches provided in a stage following the semi-conductor chopper which converts a D.C. or very low frequency input signal into an A.C. signal by chopping the input signal, a first capacitor to connect an A.C. output of the chopper with the first switch and a second capacitor to supply the output appearing across the first switch to the second switch, the first switch being so disposed and arranged as to be alternately rendered from its "ON" or conductive state to its "OFF" or non-conductive state and vice versa in synchronism with the instant of the alternating changes of conductivity of the chopper, and the second switch being so disposed and arranged as to be operated in synchronism and in opposite phase relationship with respect to the first switch. In the converter according to the present invention, at the end of the period when the first switch closes or becomes conductive, the A.C. output of the chopper with one polarity thereof is applied across the first capacitor thus charging the first capacitor and thereby removing the spike involved in the A.C. output thereof; then, during the next period in which the first switch is opened or rendered non-conductive, the signal charged across the first capacitor is added to the A.C. output of opposite polarity of the chopper whereby a voltage constituting a signal component of twice the amplitude is obtained across the first switch. The spike included in the output of the chopper during this period is also removed by applying the output to the second capacitor when the second switch is closed, thereby obtaining an A.C. output across the second switch when the latter is opened which is devoid of any spikes.

Accordingly, it is an object of the present invention to provide a spike noise elimination circuit for a D.C.-A.C. converter which eliminates by simple means the aforementioned shortcomings and drawbacks encountered in the prior art constructions.

Another object of the present invention resides in a circuit which is capable of completely removing all of the spikes in the output thereof by extremely simple means.

A further object of the present invention resides in a circuit which permits substantial removal of the spikes substantially without accompanying signal loss.

Still another object of the present invention resides in a circuit which enables complete transistorization of the operational amplifier used, for example, in analog computers.

Still a further object of the present invention resides in a circuit which may be readily used in circuits requiring high impedance D.C. amplifiers.

These and further objects, features, and advantages of the present invention will become more obvious from the following description when taken in connection with the accompanying drawing which shows, for purposes of illustration only, several embodiments in accordance with the present invention, and wherein:

FIGURE 1 is a schematic circuit diagram of one embodiment of a D.C.-A.C. converter according to the present invention;

FIGURES 2(*a*)–2(*e*) represent various wave-forms explanatory of the operation of the circuit according to the present invention;

Figure 5:
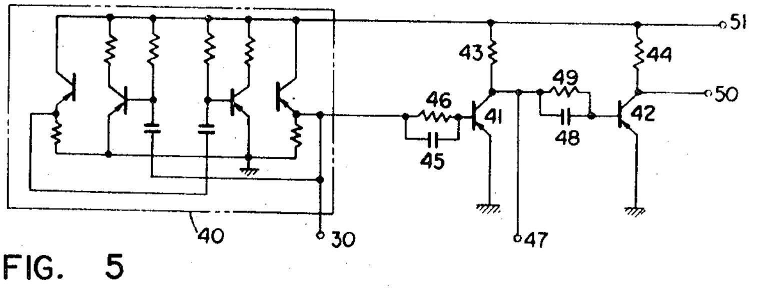
Figures 6, 7:
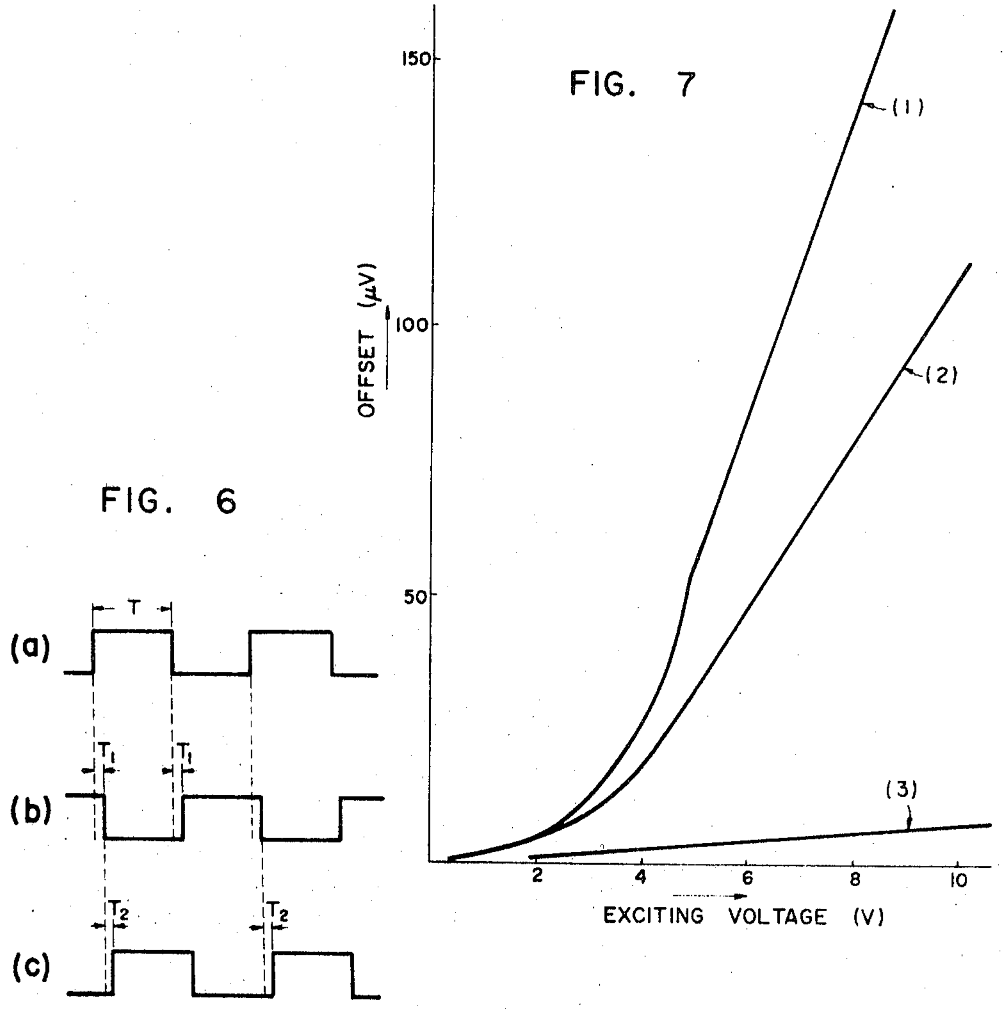

FIGURES 6(*a*)–(*c*) are wave-forms illustrating the voltages existing in various places of the circuit shown in FIGURE 5; and FIGURE 7 is a diagram illustrating the off-set voltage characteristics for the exciting voltages according to the present invention.

Figure 1:
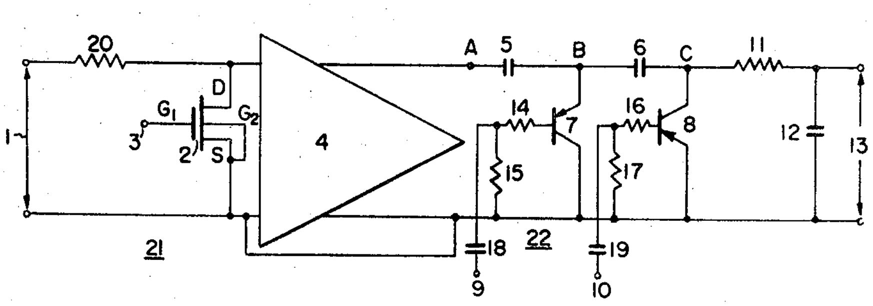

Referring now to the drawing wherein like reference numerals are used throughout the various views to designate like parts and more particularly to FIGURE 1, reference numeral 2 designates therein a conventional insulated gate field effect transistor which is utilized as a chopper for converting the D.C. input voltage into A.C. signal. The insulated gate-field effect transistor 2 includes a first gate $G_1$ to which is applied an exciting voltage, and a second gate $G_2$ directly coupled with the source S. The input terminals for the D.C. signal which is to be converted into an A.C. signal is designated by 1—1. The input signal applied to the terminals 1—1 is furnished to the drain D and to the source S of the insulated gate-field effect transistor 2 by way of the input resistor 20. Reference numeral 4 designates a conventional A.C. amplifier of any suitable construction connected with its input to the insulated gate-field effect transistor 2. Transistors 7 and 8 are used as switches for removing the spike voltage and are excited by an exciting signal applied to the exciting input terminals 9 and 10 thereof, respectively, which are connected to the corresponding bases of the transistors 7 and 8. A first coupling capacitor 5 applies the output of the A.C. amplifier 4 appearing at point A to the transistor 7, and more particularly to the emitter of this transistor 7. Reference numeral 6 designates a second coupling capacitor which applies the output of the transistor 7 to the transistor 8, the coupling capacitor 6 being connected to the collector of the transistor 8. The resistor element 11 together with the capacitor 12 form a low-pass filter connected in the output of the transistor 8, whose output will appear at the output terminals 13—13 by way of this low-pass filter. In lieu of the insulated gate-field-effect transistor 2, an ordinary junction-type transistor or any other device generally used as D.C.-A.C. converting element may be used in the present invention. Furthermore, the transistors 7 and 8, though indicated as p-n-p type transistors, may also be of n-p-n type junction transistors, or any other suitable switching elements may be used in lieu thereof. Reference numerals 14, 15, 16 and 17 designate bias resistors for transistors 7 and 8, respectively, while reference numerals 18 and 19 designate coupling capacitors.

In the circuit described above, the part from the terminals 1—1 to the transistor 2 inclusive the input resistor 20 constitutes a D.C.-A.C. converter generally designated by reference numeral 21 which converts D.C. or low-frequency input voltage into an A.C. signal having the same frequency as its exciting frequency, while the transistors 7 and 8 and the associated elements form a spike eliminator generally designated by reference numeral 22.

Operation

The operation of the device according to the present invention will now be explained by reference to the wave-forms of FIGURE 2. When a D.C. or very low frequency input voltage is applied across the input terminals 1—1 and also an exciting voltage having a wave-form shown in FIGURE 2(*b*) is applied to the first gate $G_1$ of the insulated gate-field effect transistor 2, the part between the drain D and the source S of the transistor 2 becomes "ON" or "conductive" if the first gate $G_1$ is positive with respect to the source electrode S, referring to the polarity of the voltage of FIG. 2(*b*), hence the input terminals 1—1 are short-circuited through the field-effect transistor 2 and no input signal is transmitted to the A.C. amplifier 4. When the exciting voltage is inverted to bias the first gate $G_1$ negative with respect to the source S, the insulated gate-field effect transistor 2 becomes "OFF" or "non-conductive" and the input signal is transferred to the amplifier 4.

Figure 2:
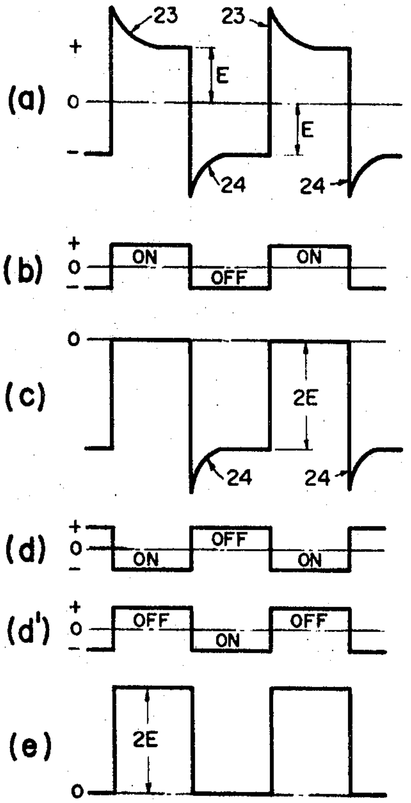

When positive and negative voltages are alternately applied to the first gate $G_1$, the insulated gate-field effect transistor 2 becomes alternately ON and OFF, i.e., conductive and non-conductive, hence the input voltage is chopped and intermittently transmitted to the A.C. amplifier 4, whose output voltage having a wave-form as shown in FIG. 2(*a*) appears at point A in FIGURE 1. In this wave-form of FIG. 2(*a*) representing the output of the A.C. amplifier 4, spikes appear as shown at 23 and 24 which are synchronized with the alternations of the conductive conditions of the insulated gate-field effect transistor 2.

Figure 3:
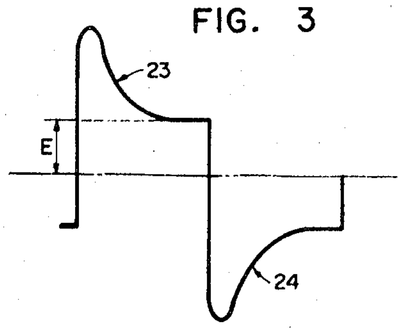
FIGURE 3 is a diagram illustrating the wave-form of the spike noise the present invention seeks to eliminate.

FIGURE 3 approximately illustrates a wave-form of the output of the amplifier 4 in which the spike portions are enlarged for the sake of clarity. It can be readily seen from FIGURE 3 that spikes 23 and 24 which are generated at the instances when the insulated gate field effect transistor 2 is excited to change from ON to OFF and vice versa, decay exponentially.

The A.C. output appearing at point A is applied to a spike-removing transistor switch 7 by way of the coupling capacitor 5. An exciting voltage, for instance, as indicated in FIG. 2(*d*) which is of inverse phase relationship with respect to the exciting voltage applied to the insulated gate field effect transistor 2 as indicated in FIG. 2(*b*) is applied to the base of the transistor 7 by way of the base terminal 9 and capacitor 18. This exciting voltage (FIG. 2(*d*)) controls the ON-OFF switching operation of the transistor switch 7. According to the present invention, the amplifier 4 and the first capacitor 5 are to be so designed that the time constant thereof which is the product of the output impedance (not shown) of the A.C. amplifier 4 by the capacitor 5 is sufficiently short in comparison to the ON period of the rectangular wave indicated in FIG. 2(*d*). When the spike-removing transistor switch 7 is closed, i.e., is excited to be in the ON condition, during the positive period of the A.C. output inclusive spike 23, no output is obtained across the transistor switch 7 and, at the end of this period, the capacitor 5 is charged to a signal voltage E.

Next, when the transistor switch 7 is opened, i.e., is excited to the OFF condition, the A.C. output during the negative period including the spike 24 is added to the voltage E appearing across the capacitor 5 and the output signal of 2E is obtained at point B in FIG. 1, hence the spike 23 is removed as shown in FIG. 2(*c*).

Spike 24 can be removed by a similar method, that is, when the A.C. output of the switch 7, from which the spike 23 has been removed as shown in FIG. 2(*c*), is applied to the spike removing transistor switch 8 by way of the capacitor 6 and an exciting voltage of a wave-form indicated in FIG. 2(*d'*), which is of opposite or inverted phase relationship with respect to the wave form shown in FIG. 2(*d*)—in the illustrated embodiment of FIGURE 1, the exciting voltage is of the same phase as that of the insulated gate field effect transistor 2—is applied to the base of the transistor 8 by way of terminal 10 and the capacitor 19, the transistor 8 is alternately operated ON-OFF, i.e., is controlled alternately so as to be conductive and non-conductive.

As a result thereof, the output having a wave-form as shown in FIGURE 2(*e*), where spikes 23 and 24 are substantially completely removed, can be obtained across the transistor switch 8, and after it is filtered out by the low-pass filter consisting of the resistor 11 and of the capacitor 12, this output appears at the output terminals 13—13.

Since the circuit in accordance with the present invention when constructed as described above, is especially characterized in utilizing two transistor switches in the spike-removing portion 22 as the spike-removing switch and in exciting these transistor switches by means of two exciting voltages of opposite phase relation with respect to each other, one obtains the advantages with the present invention that the spike can be substantially removed without accompanying signal loss as in the case of the conventional insufficient spike-removing method of the prior art.

Furthermore, in the conventional prior art devices, the spike removal is not complete, for example, because for a D.C.-A.C. converter having several tens of K-ohms for the signal source impedance, and operated with a carrier signal of more than several kc. (chopper exciting signal), the spike is remarkably increased to restrict the amplification sensitivity of the converter. In accordance with the present invention, these limitations can be expanded to about ten megohms for the signal source impedance, and also to a carrier signal of more than 100 kc. As a result thereof, an advantageous effect can be obtained with the present invention enabling complete transistorization of operational amplifiers used in the analog computers and of high-impedance D.C. amplifiers used in various industrial and scientific fields.

Figure 4:
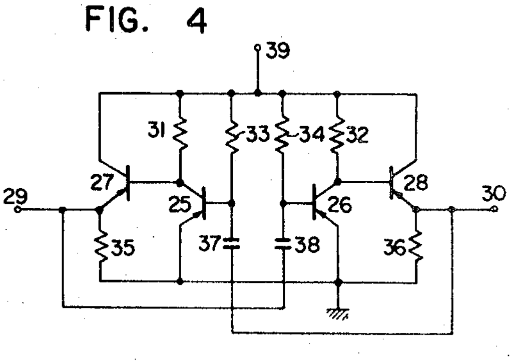
FIGURES 4 and 5 are schematic circuit diagrams of two embodiments for obtaining the exciting voltages to be used in the circuit according to the present invention.

As to the exciting device for the insulated gate-field effect transistor 2 and the spike-removing transistor switches 7 and 8, an ordinary astable multivibrator as shown in FIG. 4 can be used as one example, in which transistors 25 and 26 are included as the principal part thereof and emitter follower circuits are formed by the transistors 27 and 28, respectively, for the purpose of obtaining rectangular waves having a steeply rising wave shape. In FIGURE 4, reference numerals 29 and 30 designate the output terminals, reference numerals 31, 32, 35 and 36 designate the bias resistors; reference numerals 37 and 38 the feedback capacitors, reference numerals 33 and 34 the discharge resistors and reference numeral 39 the power supply terminal. To apply the two rectangular output waves of inverted phase relation obtained at the output terminals 29 and 30 of the astable multivibrator of FIG. 4 to the insulated gate-field effect transistor 2 and the switching transistor 7 of FIG. 1 for removing the spike 23 and to the switching transistor 8 for removing the spike 24, for example, the output terminal 29 is connected with the terminal 3 of the $G_1$ gate of the insulated gate-field effect transistor 2 and with the exciting terminal 10 of the transistor 8, while the output terminal 30 is connected with the exciting terminal 9 of the transistor 7.

As is clear from the above explanation, in accodance with the present invention the spike-removing switching transistors should be preferably excited in synchronized relationship with the excitation of the transistor chopper to remove the spike sufficiently. If any time lag exists in the operation of the switching transistors 7 and 8, a circuit to compensate for this time lag should be employed in the present invention. Such a compensating circuit is illustrated in FIGURE 5, in which reference numeral 40 designtaes again a conventional astable multivibrator such as shown in FIGURE 4, whereby an output is taken only from the terminal 30 thereof. Transistors 41 and 42 form ordinary transistor circuits whereby the base of the transistor 41 is connected with the output terminal 30 through a parallel phase-shift network consisting of resistor 46 and capacitor 45 for the purpose of delaying the phase angle of the output of the astable multivibrator 40. The base of the transistor 42 is connetced with the collector of the transistor 41 by way of a parallel network consisting of resistor 49 and capacitor 48 for the purpose of delaying the phase relation of the output of the transistor 41. Reference numerals 43 and 44 designate resistors while reference numerals 47 and 50 designate output terminals of the transistors 41 and 42, respectively. Reference numeral 51 designates the power source terminal, to which may be connected any suitable power source.

Operation

The operation of the circuit illustrated in FIGURE 5 may be explained as follows:

A wave-form shown as indicated in FIG. 6(*a*) is taken off from the output terminal 30 of FIG. 5 and the same is also applied to the base of the transistor 41 through the parallel network consisting of speed-up capacitor 45 and resistor 46. As a result of this input circuit, the transistor 41 is saturated for a period of T and an output having a delay time $T_1$ as shown in FIG. 6(*b*) can be taken off from the resistor 43 due to the minority carrier storage effect of the transistor 41, and this output appears at the output terminal 47. If this output signal, as appears at terminal 47, is again applied to the base of the transistor 42, through a parallel network consisting of speed-up capacitor 48 and resistor 49, the output signal as shown in FIGURE 6(*c*) having a time delay of $T_2$ can be similarly taken off from the resistor 44, and this output appears at the output terminal 50. For that reason, for the purpose of exciting the insulated gate-field effect transistor 2 by means of the output signal having the wave-form as shown in FIG. 6(*c*), and also for respectively exciting the transistors 7 and 8, which are used for removing the spike voltages, by means of the output signals having inverted wave-forms with respect to each other as shown in FIG. 6(*b*) and FIG. 6(*a*), the output terminal 50 of the transistor 42, the output terminal 47 of the transistor 41 and also the output terminal 30 of the astable multivibrator 40 are connected, respectively with the gate terminal 3 of the insulated gate-field effect transistor 2, the input exciting terminal 10 of the transistor 8 and the input exciting terminal 9 of the transistor 7 as shown in FIG. 1, thereby compensating for the delay times in the operation of the transistors 7 and 8, which are used for removing the spike voltages.

Although the time lags of the spike-removing switches 7 and 8 are compensated for as described above, there is, of course, no difference in the effect of removing the spike which decays exponentially. Accordingly, it is desirable that the driving time of the spike-removing switches is operated advanced by a value corresponding to the operational delay time of the switches.

FIGURE 7 illustrates characteristic curves of offset voltages ($\mu$v.) caused by the spike voltages indicated against the exciting voltage (v.) applied to the insulating gate-field effect transistor 2 utilized as chopper in accordance with the present invention. In this figure, curve (1) indicates the offset voltage produced by the spike 23, when the spike 24 only is removed by means of the spike-removing switch circuit including transistor 8 as shown in FIGURE 1, and curve (2) indicates the offset voltage produced by the spike 24, when the spike 23 only is removed in a similar way. Both of the curves are drawn against the amount calculated in terms of the exciting voltage. Curve (3) indicates the offset voltage when both spikes 23 and 24 are removed in accordance with the present invention.

As is obvious from these characteristic curves of FIG. 7, if the spikes were not removed at all, the resultant offset voltage will be approximately the sum of the values of the curves (1) and (2). For instance, if the exciting voltage is 6 volts, the offset voltage will be about 127 ($\mu$v.) However, when the spikes 23 and 24 are removed in accordance with the present invention, the offset voltage for the same exciting voltage of 6 v. will be about 4.5 ($\mu$v.) as shown by curve (3) which means that the offset voltage is improved by a factor of about 1/28.

We claim:

1. In a D.C.-A.C. converter including chopper means alternately rendered conductive and nonconductive for periodically chopping an input signal supplied thereto and thereby producing an A.C. output signal, a spike noise elimination circuit for substantially eliminating spike voltages in said output signal comprising:

first and second switch means rendered alternately conductive and non-conductive, respectively, in substantially synchronous relationship with the alternations in the conductivities of the chopper means, said first and second switch means being operated in subsantially opposite relationship to each other, and connecting means operatively connecting said first switch means with said chopper means and said second switch means with said first switch means for eliminating the spike voltages of one polarity in said output signal during the closed condition of said first switch means and for eliminating the spike voltages of the opposite polarity in said output signal during the closed condition of said second switch means whereby an output signal substantially devoid of spike voltages is produced across said second switch means during the closed condition thereof.

2. A converter according to claim 1, wherein said connecting means includes first capacitor means operatively connecting the output of the chopper means in series with the first switch means and second capacitor means in series with the second switch means and the first capacitor means.

3. A converter according to claim 2, wherein said two switch means and said chopper means are constituted by semi-conductor devices.

4. A converter according to claim 3, further comprising exciting means for alternating the conductivities of said chopper means, said first and second switch means in substantially synchronized relation to each other.

5. A converter according to claim 4, wherein said exciting means includes means for compensating delays in the operation of said first and second switch means as compared to that of said chopper means.

6. A converter according to claim 5, wherein said compensating means includes means for alternating conductivities of the first and second switch means with a predetermined time advance from the operation of the conductivity alternation of the chopper means.

7. A converter according to claim 1, wherein said two switch means and said chopper means are constituted by semi-conductor devices.

8. A converter according to claim 7, further comprising means for synchronously exciting said semi-conductor devices in such a manner as to compensate for time lags owing to delays in the operation thereof.

9. In a D.C.-A.C. converter including semi-conductor chopper means alternately rendered conductive and non-conductive for periodically chopping an input signal supplied thereto, and A.C. amplifier means operatively connected with said chopper means for amplifying the chopped signal suplied to the amplifier means from the chopper means, a spike noise elimination circuit for substantially eliminating spike voltages produced at the output of the amplifier means comprising:

first and second switch means rendered alternately conductive in substantially synchronous relationship with the alternations in the conductivities of the chopper means, said first and second switch means being connected in substantially opposite relationship to each other, first capacitor means connected in series with said first switch means and said amplifier means, and second capacitor means connected in series with said second switch means, to obtain a converted A.C. output across said second switch means.

10. A converter according to claim 9, further comprising exciting means for alternating the conductivities of said chopper, first and second switch means in substantially synchronized relation to each other.

11. A converter according to claim 10, wherein said exciting means includes means for compensating delays in the operation of said first and second switch means as compared to that of said chopper means.

12. A converter according to claim 11, wherein said compensating means includes means for alternating the conductivities of the first and second switch means with a predetermined time advance from the operation of the conductivity alternation of the chopper means.

13. A converter according to claim 9, wherein the series circuit of said second capacitor means and said second switch means are connected in parallel with said first switch means.

14. A converter according to claim 13, wherein said A.C. amplifier means has an effective output resistance and said first and second capacitor means have a capacitance, respectively, the effective output resistance of said A.C. amplifier means and the capactances of said first and second capacitor means being so selected as to render the time constants constituted by said resistance and capacitances to be sufficiently short in comparison to the period of time when the chopper means is maintained in its one conductive condition.

15. A converter according to claim 14, further comprising exciting means for alternating the conductivities of said chopper, first and second switch means in substantially synchronized relation to each other.

16. A converter according to claim 15, wherein said exciting means includes means for compensating delays in the operation of said first and second switch means as compared to that of said chopper means.

17. A converter according to claim 16, wherein said compensating means includes means for alternating the conductivities of the first and second switch means with a predetermined time advance from the operation of the conductivity alternation of the chopper means.

References Cited

UNITED STATES PATENTS 3,237,116 2/1966 Skinner et al. ---------- 330—9

OTHER REFERENCES

Barton, K., "The Field-Effect Transistor Used As A Low-Level Chopper," Electronic Engineering, February, 1965, pp. 80–83.

JOHN F. COUCH, Primary Examiner

W. M. SHOOP, Jr., Assistant Examiner

U.S. Cl. X.R.

307—240, 251, 268; 330—38